(12) United States Patent
Rathore et al.

(10) Patent No.: US 11,308,105 B2
(45) Date of Patent: Apr. 19, 2022

(54) SYSTEM, METHOD, AND COMPUTER PROGRAM PRODUCT FOR LINKING DATASETS

(71) Applicant: Visa International Service Association, San Francisco, CA (US)

(72) Inventors: Dhirender Singh Rathore, Singapore (SG); Peiwen Wang, Singapore (SG); Keyuan Wu, Singapore (SG); Dipesh Nebhnani, Singapore (SG)

(73) Assignee: Visa International Service Association, San Francisco, CA (US)

( * ) Notice: Subject to any disclaimer, the term of this patent is extended or adjusted under 35 U.S.C. 154(b) by 362 days.

(21) Appl. No.: 16/242,241

(22) Filed: Jan. 8, 2019

(65) Prior Publication Data

US 2020/0218720 A1 Jul. 9, 2020

(51) Int. Cl.
*G06F 16/00* (2019.01)
*G06F 16/2458* (2019.01)
*G06F 16/242* (2019.01)
*G06F 16/2455* (2019.01)

(52) U.S. Cl.
CPC ........ *G06F 16/2468* (2019.01); *G06F 16/244* (2019.01); *G06F 16/2455* (2019.01)

(58) Field of Classification Search
CPC ............... G06F 16/244; G06F 16/2455; G06F 16/2456; G06F 16/2468; G06F 16/256
See application file for complete search history.

(56) References Cited

U.S. PATENT DOCUMENTS

| | | | |
|---|---|---|---|
| 7,657,540 B1* | 2/2010 | Bayliss | G06F 16/283 707/999.1 |
| 2013/0226920 A1* | 8/2013 | Krishnan | G06F 16/9024 707/737 |
| 2017/0004487 A1* | 1/2017 | Hagen | G06F 16/215 |
| 2017/0052958 A1* | 2/2017 | Manning | G06F 16/35 |
| 2018/0181644 A1* | 6/2018 | Lyons | G06F 16/381 |

* cited by examiner

*Primary Examiner* — Shew Fen Lin
(74) *Attorney, Agent, or Firm* — The Webb Law Firm (57) ABSTRACT

Provided is a computer-implemented method for linking datasets using at least two keys, including matching a second key of a first dataset with a second key of a second dataset to identify a plurality of matching records, linking the plurality of matching records from the first dataset and the second dataset, matching the first key of the first dataset with the first key of the second dataset to identify a second plurality of matching records, and linking the second plurality of matching records from the first dataset and the second dataset.

11 Claims, 6 Drawing Sheets

FIG. 1

| # | Variable Name | |
|---|---|---|
| 1 | Currency | Basic key |
| 2 | Date of Issue | |
| 3 | File Create Date | Basic key |
| 4 | Txn ID | |
| 5 | Bank File Creation Date | |
| 6 | Point of Sales (Origin City) | Advanced key |
| 7 | Amount Billed | Basic key |
| 8 | Y/N Indicator | Advanced key |
| 9 | Customer ID | |

FIG. 2

| # | Variable Name | |
|---|---|---|
| 1 | Account # | Account key |
| 2 | Date | Basic key |
| 3 | Acquirer currency | Basic key |
| 4 | Acquirer amount | Basic key |
| 5 | Issuer country | |
| 6 | Issuer ID | |
| 7 | Funding source | |
| 8 | Product ID | |
| 9 | Platform | |

| Currency | Date Of Issue | File Create Date | Transaction ID | Point of Sale | Amount Billed | Y/N Indicator | Customer ID | Month of Issue | Month of File Create |
|---|---|---|---|---|---|---|---|---|---|
| USD | 2018-01-12 | 2018-01-13 | 12345 | LON | 1200 | Y | AAAAAA | 201801 | 201801 |
| USD | 2018-01-12 | 2018-01-13 | 12345 | LON | 1200 | Y | BBBBBB | 201801 | 201801 |
| USD | 2018-01-15 | 2018-01-16 | 23456 | NYC | 800 | Y | CCCCCC | 201801 | 201801 |
| USD | 2018-01-15 | 2018-01-16 | 34567 | NYC | 800 | Y | DDDDDD | 201801 | 201801 |

SYSTEM, METHOD, AND COMPUTER PROGRAM PRODUCT FOR LINKING DATASETS

BACKGROUND

Field

The present disclosure relates to linking datasets and, in particular non-limiting embodiments, to a system, method, and computer program product for linking datasets using at least two keys.

Description of Related Art

In some scenarios, two separate entities may maintain separate databases associated with user transactions. For example, a merchant system may maintain transaction records for each transaction it conducts with a customer. Such transaction records may include merchant data and, in some examples, a customer identifier. A transaction processing system that processes the transactions and settles respective accounts of the merchants and customers may maintain its own transaction records for each transaction it processes at the request of the merchant. In such circumstances, the respective datasets of the merchant and transaction processing system do not match.

Linking disparate datasets requires commonalities among the datasets. However, using a single key for matching datasets is inefficient and results in linked data that may or may not be accurate. The accuracy of the linked data in such examples is static across all data records.

SUMMARY

According to a non-limiting embodiment, provided is a computer-implemented method for linking datasets using at least two keys, comprising: generating a first key for a first dataset based on a plurality of parameters of the first dataset; generating a first key for a second dataset based on a plurality of parameters of the second dataset; generating a second key for the first dataset based on a subset of the plurality of parameters of the first dataset; generating a second key for the second dataset based on a subset of the plurality of parameters of the second dataset; matching, with at least one processor, the second key of the first dataset with the second key of the second dataset to identify a plurality of matching records; linking, with at least one processor, the plurality of matching records from the first dataset and the second dataset; matching, with at least one processor, the first key of the first dataset with the first key of the second dataset to identify a second plurality of matching records; and linking, with at least one processor, the second plurality of matching records from the first dataset and the second dataset.

In non-limiting embodiments, matching the second key of the first dataset with the second key of the second dataset comprises determining the plurality of matching records based on a fuzzy matching algorithm and a first confidence threshold. In non-limiting embodiments, matching the first key of the first dataset with the first key of the second dataset comprises determining the second plurality of matching records based on the fuzzy matching algorithm and the first confidence threshold. In non-limiting embodiments, the method further includes matching, with at least one processor, the second key of the first dataset with the second key of the second dataset to identify a third plurality of matching records based on a fuzzy matching algorithm and a second confidence threshold and linking, with at least one processor, the third plurality of matching records from the first dataset and the second dataset. In non-limiting embodiments, the method further includes matching, with at least one processor, the first key of the first dataset with the first key of the second dataset to identify a fourth plurality of matching records based on a fuzzy matching algorithm and the second confidence threshold and linking, with at least one processor, the fourth plurality of matching records from the first dataset and the second dataset. In non-limiting embodiments, the method further includes the same at least one processor performs the generating steps, the matching steps, and the linking steps. In non-limiting embodiments, the second key of the first data set comprises an advanced key, the first key of the first set comprises a basic key, and the advanced key comprises the basic key and at least one additional parameter.

According to another non-limiting embodiment, provided is a system for linking datasets using dual keys, comprising: at least one data storage device comprising a first dataset and a second dataset; at least one processor in communication with the at least one data storage device, the at least one processor programmed or configured to: generate a first key for the first dataset based on a plurality of parameters of the first dataset; generate a first key for the second dataset based on a plurality of parameters of the second dataset; generate a second key for the first dataset based on a subset of the plurality of parameters of the first dataset; generate a second key for the second dataset based on a subset of the plurality of parameters of the second dataset; match the second key of the first dataset with the second key of the second dataset to identify a plurality of matching records; link the plurality of matching records from the first dataset and the second dataset; match the first key of the first dataset with the first key of the second dataset to identify a second plurality of matching records; and link the second plurality of matching records from the first dataset and the second dataset.

In non-limiting embodiments, matching the second key of the first dataset with the second key of the second dataset comprises determining the plurality of matching records based on a fuzzy matching algorithm and a first confidence threshold. In non-limiting embodiments, matching the first key of the first dataset with the first key of the second dataset comprises determining the second plurality of matching records based on the fuzzy matching algorithm and the first confidence threshold. In non-limiting embodiments, the at least one processor is programmed or configured to: match the first key of the first dataset with the first key of the second dataset to identify a third plurality of matching records based on a fuzzy matching algorithm and a second confidence threshold; and link the third plurality of matching records from the first dataset and the second dataset. In non-limiting embodiments, the at least one processor is programmed or configured to: match the second key of the first dataset with the second key of the second dataset to identify a fourth plurality of matching records based on a fuzzy matching algorithm and the second confidence threshold; and link the fourth plurality of matching records from the first dataset and the second dataset. In non-limiting embodiments, the at least one data storage device comprises a first storage device and a second storage device, the first dataset is stored on the first storage device and the second dataset is stored on the second storage device. In non-limiting embodiments, the second key of the first data set comprises an advanced key, the first key of the first set comprises a basic key, and the advanced key comprises the basic key and at least one additional parameter.

According to another non-limiting embodiment, provided is a computer program product for linking datasets using dual keys, comprising at least one non-transitory computer-readable medium including program instructions that, when executed by at least one processor, cause the at least one processor to: generate a first key for a first dataset based on a plurality of parameters of the first dataset; generate a first key for a second dataset based on a plurality of parameters of the second dataset; generate a second key for the first dataset based on a subset of the plurality of parameters of the first dataset; generate a second key for the second dataset based on a subset of the plurality of parameters of the second dataset; match the second key of the first dataset with the second key of the second dataset to identify a plurality of matching records; link the plurality of matching records from the first dataset and the second dataset; match the first key of the first dataset with the first key of the second dataset to identify a second plurality of matching records; and link the second plurality of matching records from the first dataset and the second dataset.

In non-limiting embodiments, matching the second key of the first dataset with the second key of the second dataset comprises determining the plurality of matching records based on a fuzzy matching algorithm and a first confidence threshold. In non-limiting embodiments, matching the first key of the first dataset with the first key of the second dataset comprises determining the second plurality of matching records based on the fuzzy matching algorithm and the first confidence threshold. In non-limiting embodiments, the program instructions further cause the at least one processor to: match the first key of the first dataset with the first key of the second dataset to identify a third plurality of matching records based on a fuzzy matching algorithm and a second confidence threshold; and link the third plurality of matching records from the first dataset and the second dataset. In non-limiting embodiments, the program instructions further cause the at least one processor to: match the second key of the first dataset with the second key of the second dataset to identify a fourth plurality of matching records based on a fuzzy matching algorithm and the second confidence threshold; and link the fourth plurality of matching records from the first dataset and the second dataset. In non-limiting embodiments, the second key of the first data set comprises an advanced key, the first key of the first set comprises a basic key, and the advanced key comprises the basic key and at least one additional parameter.

These and other features and characteristics of the disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION

For purposes of the description hereinafter, the terms "upper," "lower," "right," "left," "vertical," "horizontal," "top," "bottom," "lateral," "longitudinal," and derivatives thereof shall relate to non-limiting embodiments as they are oriented in the drawing figures. However, it is to be understood that non-limiting embodiments may assume various alternative variations and step sequences, except where expressly specified to the contrary. It is also to be understood that the specific devices and processes illustrated in the attached drawings, and described in the following specification, are simply exemplary embodiments. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc. between the first and second unit or device. It will be appreciated that numerous arrangements are possible. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX), etc.), and/or the like.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices.

As used herein, the term "computing device" may refer to one or more electronic devices that are configured to directly or indirectly communicate with or over one or more networks. The computing device may be a mobile device. The computing device may be a desktop computer or other non-mobile computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications, a token service executing one or more software applications, and/or the like. A transaction processing server may include one or more processors and, in some non-limiting embodiments, may be operated by or on behalf of a transaction service provider. A token service may include one or more computer systems and/or applications for generating tokens corresponding to user accounts issued by one or more issuer institutions.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a merchant's POS system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments provide for a system, method, and computer program product for linking two datasets that do not contain unique, identical keys upon which the datasets can be matched. Through the use of two or more keys and an algorithm, non-limiting embodiments conserve computing resources by avoiding additional processing of larger, resource-intensive keys across all data. For example, merchant data may identify a customer by a customer identifier and include additional details about a transaction, such as the items purchased, individual prices for the items, and the like, while transaction processing system data may identify a customer by a PAN and/or other parameters that differ from the merchant data. Non-limiting embodiments allow for these two datasets to be linked, thereby improving the computational efficiency of operations or queries to that data. Non-limiting embodiments effectuate these improvements through the use of at least two keys, including a basic key and an advanced key, for each dataset. A sequence of fuzzy matches is performed on the multiple keys using two or more different thresholds. Through the use of a multi-staged sequence of actions and the use of multiple keys and thresholds, non-limiting embodiments provide matches of varying confidence levels and results in an accurately linked dataset and/or aggregated dataset.

Figure 1:
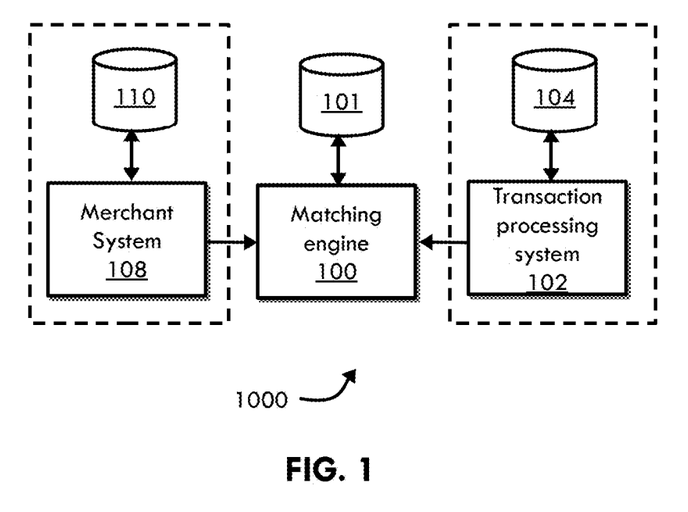
FIG. 1 illustrates a schematic diagram of a system for linking two datasets according to a non-limiting embodiment.

FIG. 1 shows a system 1000 for linking two datasets according to a non-limiting embodiment. A merchant system 108 is in communication with a merchant database 110 including merchant data. A transaction processing system 102 is in communication with a transaction database 104 including transaction data. The merchant data may include, for example, transactions engaged in by the merchant that identify a customer with a customer identifier, one or more items purchased for each transaction, prices for each item, and/or the like. The transaction data may include data associated with transactions engaged in by the merchant but may not include the same customer identifiers and/or may not include specific line-item information (e.g., specific items purchases, prices of individual items, etc.). For example, a merchant may identify a customer by a customer identifier and a transaction processing system may identify the same individual with a PAN or other account number.

With continued reference to FIG. 1, a matching engine 100 is in communication with the merchant system 108 and the transaction processing system 102. The matching engine 100 may include hardware and/or software configured to process and match different datasets. The matching engine 100 may include, for example, one or more software applications executing on one or more computing devices. In some non-limiting embodiments, the matching engine 100 may be part of the transaction processing system 102. However, it will be appreciated that the matching engine 100 may also be part of the merchant system 108, an issuer system (not shown), or any other system in communication with both the merchant system 108 and the transaction processing system 102.

With continued reference to FIG. 1, the merchant data may be communicated to the matching engine 100 via an Application Programming Interface (API) or through any other means. The merchant data may be provided to the matching engine 100 as files retrieved directly from the merchant database 110 and/or may be provided as a stream or file(s) of structured data (e.g., JavaScript Object Notation (JSON), comma separated values (CSV), and/or the like). The transaction data may be provided to the matching engine 100 as files retrieved directly from the transaction database 104 and, in other examples, may be provided as a stream or file(s) of structured data. The matching engine, based on two or more inputted datasets, generates a linked dataset (e.g., an aggregated dataset) that combines at least portions of the two datasets and stores the combined data in a linked database 101. It will be appreciated that the linked dataset may also or alternatively be stored in the merchant database 110 and/or transaction database 104.

Figure 2:
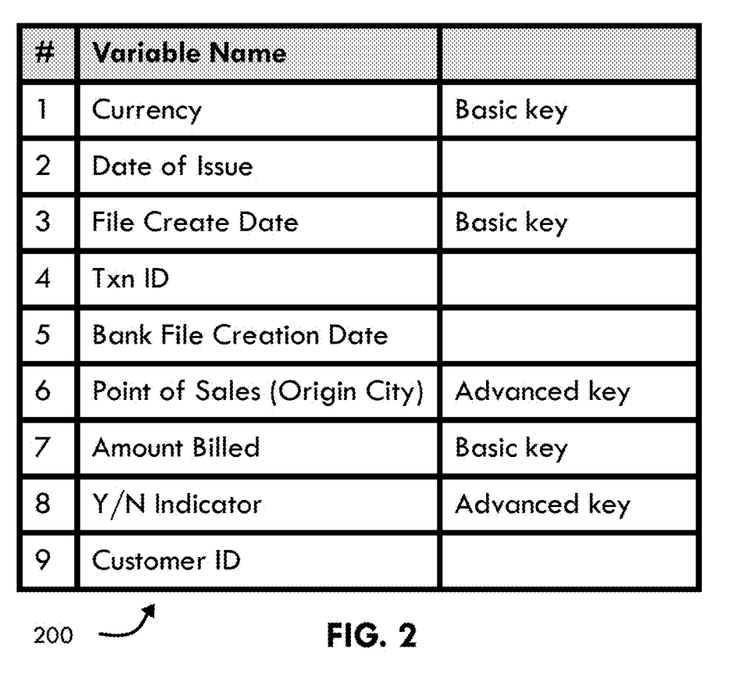
FIG. 2 illustrates a set of parameters defining a first dataset according to a non-limiting embodiment.
Figure 3A:
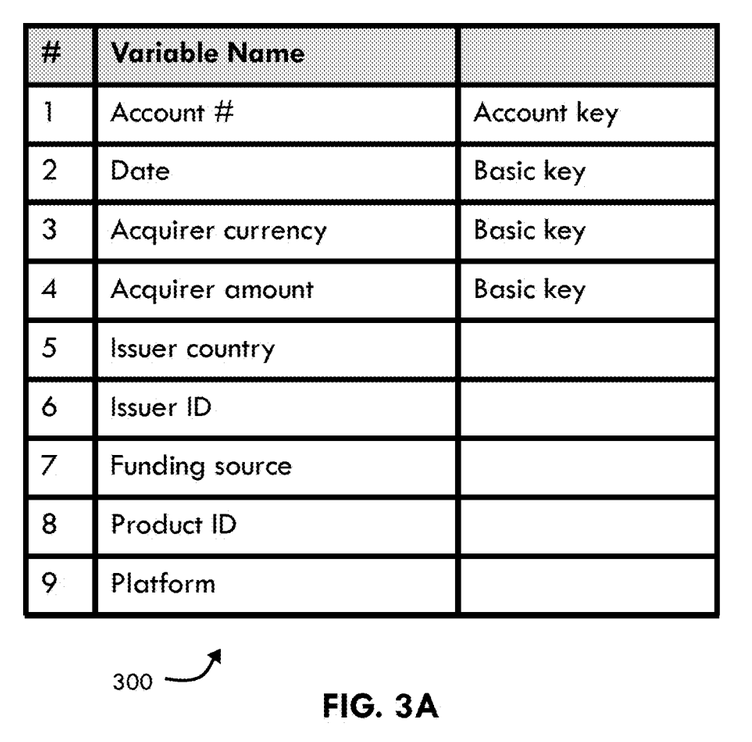
FIGS. 3A-3C illustrate a set of parameters defining a second dataset according to a non-limiting embodiment.

Referring now to FIG. 2, an example set of parameters 200 defining a merchant dataset is shown according to a non-limiting embodiment. The dataset 200 includes several parameters that define a plurality of individual data records in the dataset 200: currency, date of issue, file create date, transaction identifier, bank file creation date, origin city of sale, amount billed, a yes/no indicator, and a customer identifier. It will be appreciated that more or fewer parameters may be part of any dataset. The yes/no indicator may include a flag or other value used to indicate that information associated with another parameter (e.g., origin city) is usable and/or accurate. Based on the parameters of the merchant dataset 200 and a corresponding transaction dataset (an example is shown in FIG. 3A) to be linked, at least two keys are determined upon which to match. A key includes one or more parameters of a dataset. As shown in the example of FIG. 2, a first key (e.g., a basic key) includes the currency, file create date, and amount billed parameters. The second key (e.g., an advanced key) includes all of the parameters of the basic key plus the origin city and yes/no indicator parameters. The basic key and the advanced key may be any subset or combination of parameters of the merchant dataset 200.

Referring now to FIG. 3A, an example transaction dataset 300 is shown according to a non-limiting embodiment. The dataset 300 includes several parameters that define a plurality of individual data records in the dataset 300: account number, date, acquirer currency, acquirer amount, issuer country, issuer identifier, funding source, product identifier, and platform. It will be appreciated that more or fewer parameters may be part of any dataset. Based on the parameters of the transaction dataset 300 and the corresponding merchant dataset (an example shown in FIG. 2) to be linked, at least two keys are determined upon which to match. A key includes one or more parameters of a dataset. As shown in the example of FIG. 3A, a first key (e.g., a basic key) of the transaction dataset includes the date, acquirer currency, and acquirer amount. In this example, the date of this dataset 300 corresponds with the file create date of the dataset 200 shown in FIG. 2, the acquirer currency corresponds with the currency parameter of the dataset 200 shown in FIG. 2, and the acquirer amount corresponds with the amount billed in the dataset 200 shown in FIG. 2. The second key (e.g., an advanced key) of the transaction dataset 300 includes all of the parameters from the basic key plus a city code. The city code corresponds with the origin city in the dataset 200 shown in FIG. 2, but is not part of the dataset 300 shown in FIG. 3A. As explained below, the city code is determined and, in some examples, appended to the dataset 300 shown in FIG. 3A to facilitate the matching process.

Figure 3B:
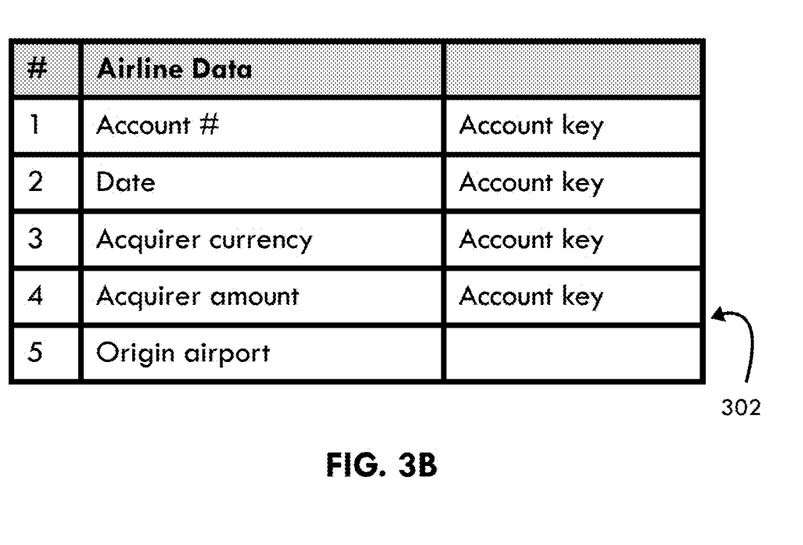
Figure 3C:
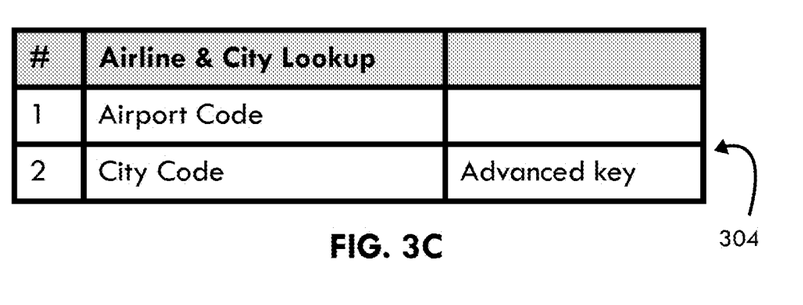

In non-limiting embodiments, the transaction dataset may include multiple datasets available to a transaction processing system. For example, and with reference to FIGS. 3A-3C, FIG. 3A shows transaction-level data, FIG. 3B shows data reported to the transaction processing system by the merchant (e.g., a subset of the merchant data for a given transaction), and FIG. 3C is a look-up table. In the example shown in FIGS. 3A-3C, the merchant is an airline. However, it will be appreciated that various types of merchant data may be linked with transaction data. Accordingly, the dataset shown in FIG. 3B includes flight information associated with a transaction including origination (e.g., departure) airport and destination (e.g., arrival) airport. In this example, a basic key may be generated based on the transaction dataset shown in FIG. 3A. However, for an advanced key, additional parameters may be needed from other datasets. In this example, the advanced key generated with parameters from the dataset 300 shown in FIG. 3A also uses a city code corresponding to the origin (e.g., departure) airport.

The dataset shown in FIG. 3B includes origin airport but not the city code, and the dataset shown in FIG. 3C includes an airport code and a city code. In this manner, an account key is formed from one or more parameters in the dataset 302 shown in FIG. 3B, including account number, date, acquirer currency, and acquirer amount. An account key may be a third key (e.g., one or more parameters) of the transaction dataset that allows linkage with other transaction datasets, in this example based on an account number. A corresponding account key is also generated based on the parameters shown in the dataset 300 in FIG. 3A, including all of the parameters of the basic key in addition to the account number. In this way, the datasets 300, 302 shown in FIGS. 3A and 3B may be matched and correlated. Once the appropriate record(s) are determined from the dataset 302 in FIG. 3B, an origin airport is identified. However, the advanced key utilizes a city code, not an origin airport. The origin airport parameter in the dataset 302 shown in FIG. 3B is therefore used as a key with the airport code parameter in the look-up table 304 shown in FIG. 3C. By determining a matching airport code, a city code is identified in the look-up table 304 and appended to the dataset 302 shown in FIG. 3B.

The first key and the second key of the first dataset (e.g., a merchant dataset) map to parameters in a plurality of data records in that dataset. The first key and the second key of the second dataset (e.g., a transaction dataset) map to parameters in a plurality of data records in that dataset. The first keys (e.g., basic keys) of the respective datasets are created by determining one or more parameters of each dataset that may include the same value for any given transaction and/or customer. Likewise, the second keys (e.g., advanced keys) of the respective databases are created by determining one or more parameters of each dataset that may include the same value for any given transaction and/or customer. In some examples, the second key may include all of the parameters of the first key and at least one additional parameter. However, it will be appreciated that the first and second keys may not overlap in some examples.

In non-limiting embodiments, non-matching data records may be erroneously identified based on duplicate keys (e.g., records that do not match but where one or more of the first or second keys match). For example, if a first customer purchases an airline ticket for herself and for other individuals in a single transaction, the merchant dataset may have an individual record for each individual (e.g., different customer identifiers for each entry). This may be a result of the manner in which a merchant stores data, such as an airline that creates records per passenger rather than per transaction or account. In such a scenario, the first key and second key may match for each of those different records even though the customer identifiers differ. Therefore a transaction dataset may have a record that partially matches to multiple merchant records. In such an example, the system may determine which of the matching merchant records is a primary record based on a transaction history of that customer. For example, a merchant record for a customer that is associated with the highest number of airline ticket purchases (or other item or service) over a period of time (e.g., two years) may be determined to be a record that is matched with the transaction record and, in some examples, stored in a linked database.

In another example, two customers may conduct a transaction at the same time for an item having similar characteristics and under similar circumstances. In the example of airline tickets, two separate customers may purchase a ticket at the same time, for the same date, with the same departure and arrival locations, and for the same price. In such scenarios, the matching engine may identify two or more transaction records (e.g., two or more separate account holders) as matches because the parameters chosen for the first and second keys may be the same across the two or more records. In this example, the transaction identifiers will be different in the records of the transaction dataset. In such an example, both of the records will be stored in the database. After the records are compared for matching (e.g., steps 500, 510, 520, and 530 in FIGS. 5A-5B), the system may determine which of the matched accounts is most likely to be the actual account of the customer based on the matching result of the specific customer's records. For example, a customer might be matched with 3 accounts A, B, and C with matching records of 9, 2, and 1, respectively. The account with highest number of matching records (e.g., account A in this example) with the customer may therefore be determined to be the account that is associated with the customer.

Figure 4:
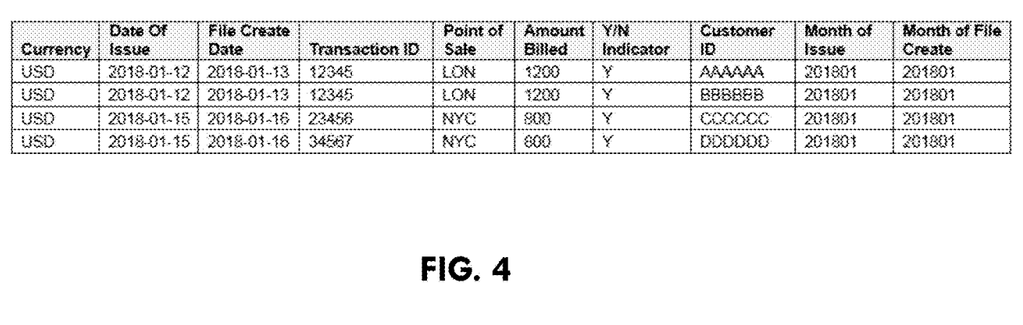
FIG. 4 illustrates a dataset generated with duplicate keys according to a non-limiting embodiment.

Referring now to FIG. 4, a partial merchant dataset is shown according to a non-limiting embodiment. The first two records (e.g., rows) share an identical transaction identifier but have different customer identifiers. As explained in an example above, this could result if a first customer purchases an item for herself and items for other individuals in a single transaction, but where the merchant dataset stores an individual record separately for each individual (e.g., with different customer identifiers). In this case, the first record is determined to be the primary record (and associated with the primary customer identifier) and that is used to match with the transaction dataset. Accordingly, the second record may be disregarded for purposes of matching or generating an aggregated dataset. Also as shown in FIG. 4, the third and fourth records have different transaction identifiers and different customer identifiers but are otherwise identical. As explained in an example above, this could result from more than one individual conducting a transaction at the same time for an item having similar characteristics and under similar circumstances.

Figure 5A:
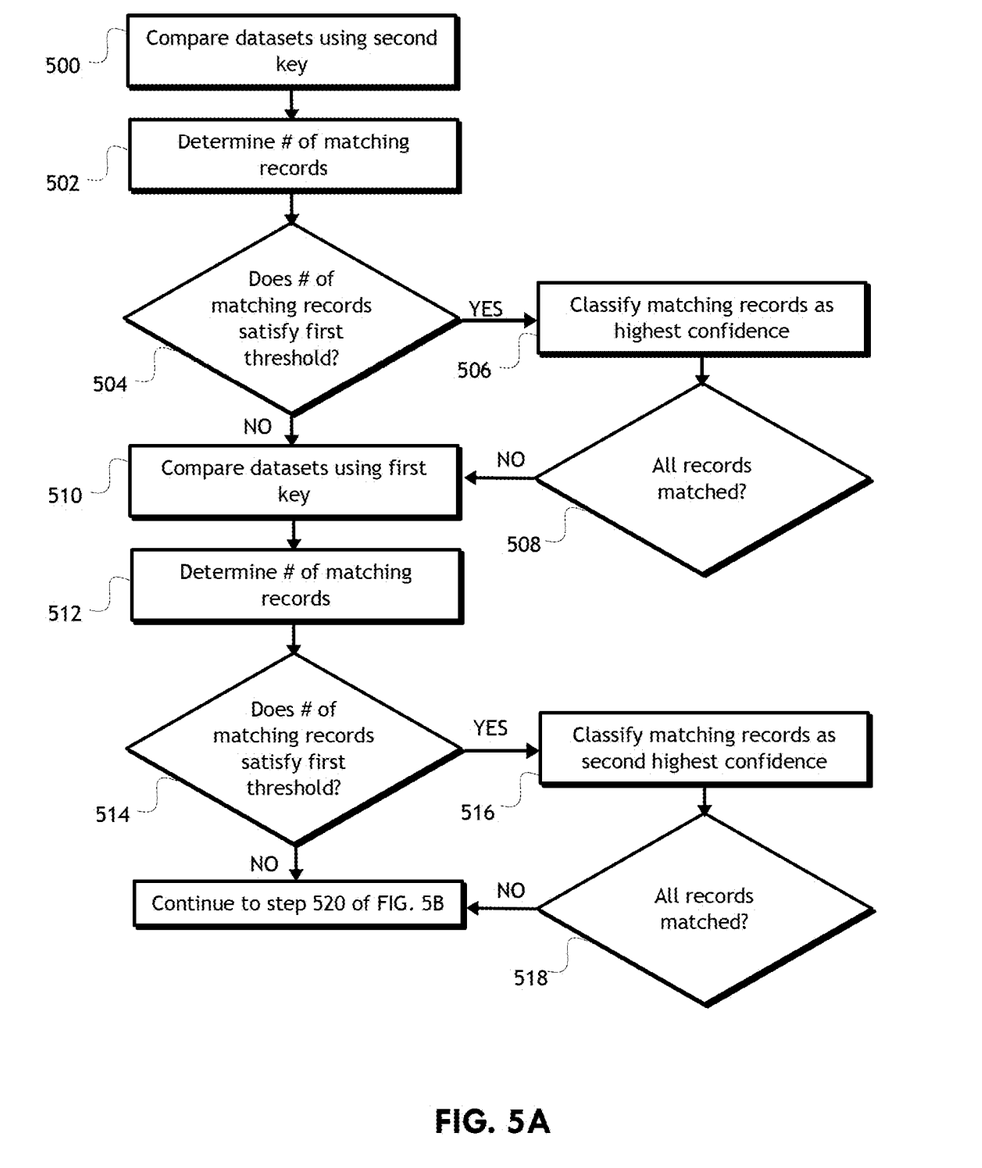
FIGS. 5A-5B illustrate a method for linking two datasets according to a non-limiting embodiment.
Figure 5B:
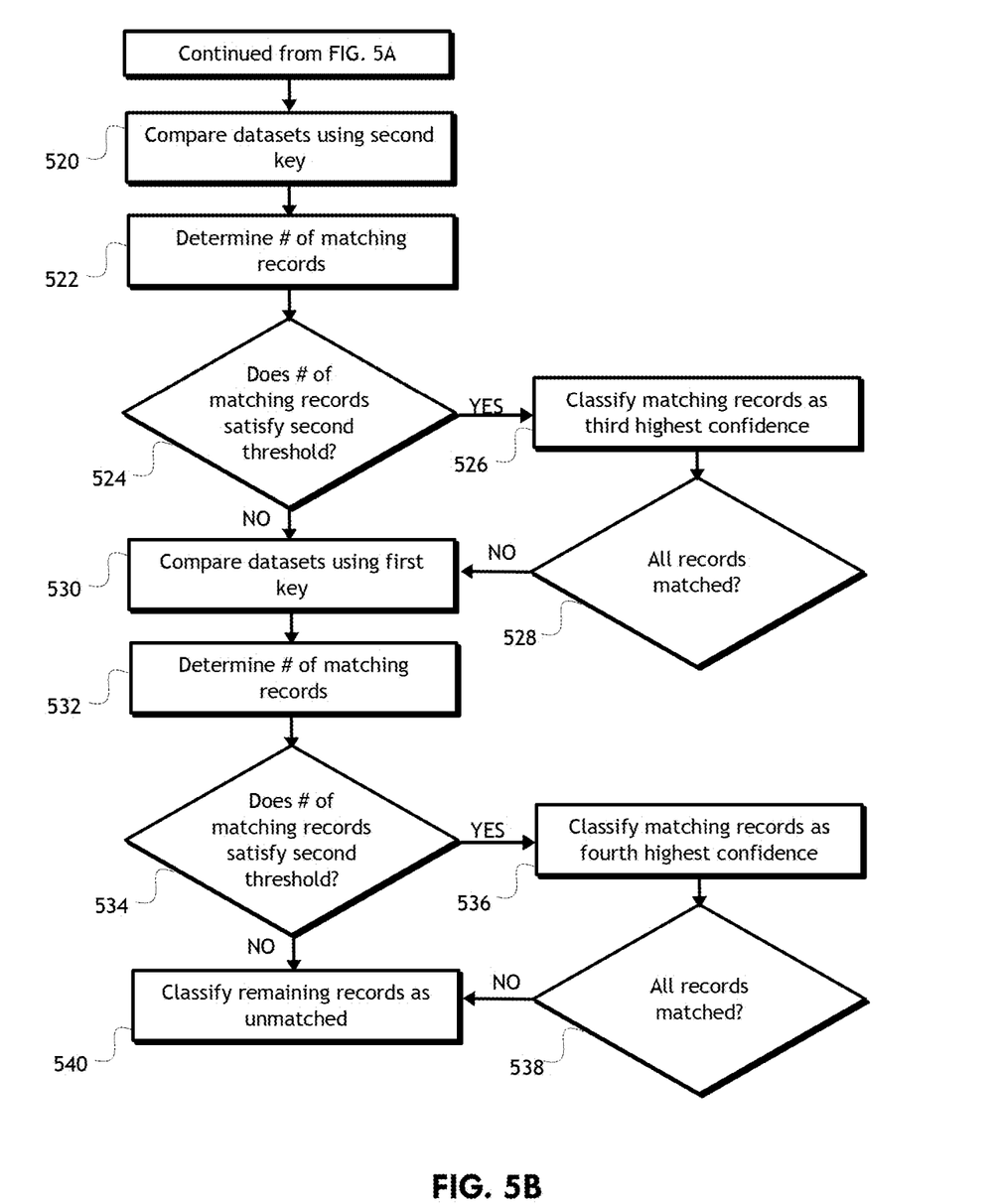

Referring now to FIGS. 5A and 5B, a method for linking two datasets is shown according to a non-limiting embodiment. The steps in FIGS. 5A and 5B are for example purposes only. It will be appreciated that non-limiting embodiments may include more steps, fewer steps, a different arrangement or order of steps, and/or the like. Starting with a first key (e.g., basic key) and a second key (e.g., advanced key) for each of at least two datasets, at step 500 the data records of each dataset are compared by matching the parameters of the data records corresponding to the second key (e.g., an advanced key) of each dataset. At step 502, the number of matching data records is determined based on the comparison. At step 504, the number of matching data records is compared to a first threshold. The first threshold may be predefined, dynamically generated based on one or more values, and/or otherwise configured. If the number of matching data records satisfies the first threshold (e.g., is greater than, less than, greater than or equal to, less than or equal to, etc.), the method proceeds to step 506. In non-limiting embodiments, the first threshold may be 2, such that the threshold is satisfied if 2 or more data records are matched between the datasets using the second key. At step 506, the matching records are classified as matched records at a highest confidence level. At step 508, it is determined if all of the records were matched at the highest confidence level. If the records are all matched, the method may end.

Referring to FIG. 5A, if the records are not matched at step 508 or if the number of matching records does not satisfy the first threshold at step 504, the method proceeds to step 510 and the remaining records of each dataset are compared by matching the parameters of the data records corresponding to the first key (e.g., a basic key) of each dataset. At step 512, the number of matching data records is determined based on the comparison. At step 514, the number of matching data records is compared to the first threshold. As described above, the threshold may be predefined, dynamically generated based on one or more values, and/or otherwise configured. If the number of matching data records satisfies the first threshold (e.g., is greater than, less than, greater than or equal to, less than or equal to, etc.), the method proceeds to step 516. At step 516, the matching records are classified as matched records at a second highest confidence level. At step 518, it is determined if all of the remaining records were matched at the second highest confidence level. If the records are all matched, the method ends.

Still referring to FIGS. 5A and 5B, if the records are not matched at step 518 or if the number of matching records does not satisfy the first threshold at step 514, the method proceeds to step 520 and the remaining records of each dataset are compared by matching the parameters of the data records corresponding to the second key (e.g., an advanced key) of each dataset. At step 522, the number of matching data records is determined based on the comparison. At step 524, the number of matching data records is compared to a second threshold. The second threshold may differ from the first threshold and may be predefined, dynamically generated based on one or more values, and/or otherwise configured. If the number of matching data records satisfies the second threshold (e.g., is greater than, less than, greater than or equal to, less than or equal to, etc.), the method proceeds to step 526. In non-limiting embodiments, the second threshold may be 1, such that the threshold is satisfied if at least one data record is matched between the datasets using the second key. At step 526, the matching records are classified as matched records at a third highest confidence level. At step 528, it is determined if all of the remaining records were matched at the third highest confidence level. If the records are all matched, the method may end.

Referring to FIG. 5B, if the records are not matched at step 528 or if the number of matching records does not satisfy the second threshold at step 524, the method proceeds to step 530 and the remaining records of each dataset are compared by matching the parameters of the data records corresponding to the first key (e.g., a basic key) of each dataset. At step 532, the number of matching data records is determined based on the comparison. At step 534, the number of matching data records is compared to the second threshold. As explained above, the second threshold may differ from the first threshold and may be predefined, dynamically generated based on one or more values, and/or otherwise configured. If the number of matching data records satisfies the second threshold (e.g., is greater than, less than, greater than or equal to, less than or equal to, etc.), the method proceeds to step 536. At step 536, the matching records are classified as matched records at a fourth highest confidence level. At step 538, it is determined if all of the remaining records were matched at the fourth highest confidence level. If the records are all matched, the method ends. If the records are not matched at step 538 or if the number of matching records does not satisfy the second threshold at step 534, the remaining records are classified as unmatched.

It will be appreciated that, although the example shown in FIGS. 5A-5B utilizes two keys, two datasets, and two different thresholds, variations are possible with more than two keys, more than two datasets, and any number of different thresholds. Moreover, although the example discussed results in classifications of four levels of confidence, it will be appreciated that any number of classifications may be utilized to indicate a confidence determination that the records are likely to match.

In an example in which two datasets were compared to match customer records of a particular merchant and account holder records of a transaction processing system, a non-limiting embodiment of a system and method for linking two datasets resulted in 27% of records matched at a highest level of confidence, 31% of records matched at a second highest level of confidence, 36% of records matched at a third highest level of confidence, and 7% of records matched a fourth highest level of confidence.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment or aspect.

What is claimed is:

1. A computer-implemented method for linking datasets using at least two keys, comprising:
generating a basic key for a first dataset based on a plurality of parameters of the first dataset;
generating a basic key for a second dataset based on a plurality of parameters of the second dataset;
generating an advanced key for the first dataset based on the plurality of parameters of the first dataset and at least one additional parameter;
generating an advanced key for the second dataset based on the plurality of parameters of the second dataset and at least one additional parameter;
matching, with at least one processor, the advanced key of the first dataset with the advanced key of the second dataset to identify a plurality of matching records based on a fuzzy matching algorithm;
determining, with at least one processor, that a number of records in the plurality of matching records satisfies a threshold;
in response to determining that the number of records in the plurality of matching records satisfies the threshold, linking, with at least one processor, the plurality of matching records from the first dataset and the second dataset;
matching, with at least one processor, the basic key of the first dataset with the basic key of the second dataset to identify a second plurality of matching records among records in the first dataset and the second dataset other than the plurality of matching records already linked based on the fuzzy matching algorithm;
determining, with at least one processor, that a number of records in the second plurality of matching records satisfies the threshold or a second threshold; and
in response to determining that the number of records in the second plurality of matching records satisfies the threshold or the second threshold, linking, with at least one processor, the second plurality of matching records from the first dataset and the second dataset;
matching, with at least one processor, the advanced key of the first dataset with the advanced key of the second dataset to identify a third plurality of matching records based on the fuzzy matching algorithm and the second threshold;
linking, with at least one processor, the third plurality of matching records from the first dataset and the second dataset; and
generating, with at least one processor, a linked dataset based on the linked matching records.

2. The computer-implemented method of claim 1, further comprising:
matching, with at least one processor, the basic key of the first dataset with the basic key of the second dataset to identify a fourth plurality of matching records based on the fuzzy matching algorithm and the second confidence threshold; and
linking, with at least one processor, the fourth plurality of matching records from the first dataset and the second dataset.

3. The computer-implemented method of claim 1, wherein the same at least one processor performs the generating steps, the matching steps, and the linking steps.

4. The computer-implemented method of claim 1, wherein the advanced key comprises the basic key and at least one additional parameter.

5. A system for linking datasets using dual keys, comprising:
at least one data storage device comprising a first dataset and a second dataset; and
at least one processor in communication with the at least one data storage device, the at least one processor programmed or configured to:

generate a basic key for the first dataset based on a plurality of parameters of the first dataset;
generate a basic key for the second dataset based on a plurality of parameters of the second dataset;
generate an advanced key for the first dataset based on the plurality of parameters of the first dataset and at least one additional parameter;
generate an advanced key for the second dataset based on the plurality of parameters of the second dataset and at least one additional parameter;
match the advanced key of the first dataset with the advanced key of the second dataset to identify a plurality of matching records based on a fuzzy matching algorithm;
determine whether a number of records in the plurality of matching records satisfies a threshold;
if the number of records in the plurality of matching records satisfies the threshold, link the plurality of matching records from the first dataset and the second dataset;
match the basic key of the first dataset with the basic key of the second dataset to identify a second plurality of matching records among records in the first dataset and the second dataset other than the plurality of matching records already linked based on a fuzzy matching algorithm;
determine whether a number of records in the second plurality of matching records satisfies the threshold or a second threshold; and
if the number of records in the second plurality of matching records satisfies the threshold or the second threshold, link the second plurality of matching records from the first dataset and the second dataset;
match the advanced key of the first dataset with the advanced key of the second dataset to identify a third plurality of matching records based on the fuzzy matching algorithm and the second threshold;
link the third plurality of matching records from the first dataset and the second dataset; and
generate a linked dataset based on the linked matching records.

6. The system of claim 5, wherein the at least one processor is programmed or configured to:
match the basic key of the first dataset with the basic key of the second dataset to identify a fourth plurality of matching records based on the fuzzy matching algorithm and the second confidence threshold; and
link the fourth plurality of matching records from the first dataset and the second dataset.

7. The system of claim 5, wherein the at least one data storage device comprises a first storage device and a second storage device, wherein the first dataset is stored on the first storage device, and wherein the second dataset is stored on the second storage device.

8. The system of claim 5, wherein the advanced key comprises the basic key and at least one additional parameter.

9. A computer program product for linking datasets using dual keys, comprising at least one non-transitory computer-readable medium including program instructions that, when executed by at least one processor, cause the at least one processor to:
generate a basic key for a first dataset based on a plurality of parameters of the first dataset;
generate a basic key for a second dataset based on a plurality of parameters of the second dataset;
generate an advanced key for the first dataset based on the plurality of parameters of the first dataset and at least one additional parameter;
generate an advanced key for the second dataset based on the plurality of parameters of the second dataset and at least one additional parameter;
match the advanced key of the first dataset with the advanced key of the second dataset to identify a plurality of matching records based on a fuzzy matching algorithm;
determine whether a number of records in the plurality of matching records satisfies a threshold;
link the plurality of matching records from the first dataset and the second dataset if the number of records in the plurality of matching records is determined to satisfy the threshold;
match the basic key of the first dataset with the basic key of the second dataset to identify a second plurality of matching records among records in the first dataset and the second dataset other than the plurality of matching records already linked based on a fuzzy matching algorithm;
determine whether a number of records in the second plurality of matching records satisfies the threshold or a second threshold;
link the second plurality of matching records from the first dataset and the second dataset if the number of records in the second plurality of matching records satisfies the threshold or the second threshold;
match the advanced key of the first dataset with the advanced key of the second dataset to identify a third plurality of matching records based on the fuzzy matching algorithm and the second threshold;
link the third plurality of matching records from the first dataset and the second dataset; and
generate a linked dataset based on the linked matching records.

10. The computer program product of claim 9, wherein the program instructions further cause the at least one processor to:
match the basic key of the first dataset with the basic key of the second dataset to identify a fourth plurality of matching records based on the fuzzy matching algorithm and the second confidence threshold; and
link the fourth plurality of matching records from the first dataset and the second dataset.

11. The computer program product of claim 9, wherein the advanced key comprises the basic key and at least one additional parameter.

* * * * *

UNITED STATES PATENT AND TRADEMARK OFFICE
CERTIFICATE OF CORRECTION

PATENT NO. : 11,308,105 B2
APPLICATION NO. : 16/242241
DATED : April 19, 2022
INVENTOR(S) : Dhirender Singh Rathore et al.

Page 1 of 1

It is certified that error appears in the above-identified patent and that said Letters Patent is hereby corrected as shown below:

In the Claims

Column 12, Line 29, Claim 1, delete "threshold; and" and insert -- threshold; --

Column 13, Line 29, Claim 5, delete "threshold; and" and insert -- threshold; --

Signed and Sealed this
Twenty-eighth Day of June, 2022

Katherine Kelly Vidal
*Director of the United States Patent and Trademark Office*